Patented June 5, 1934

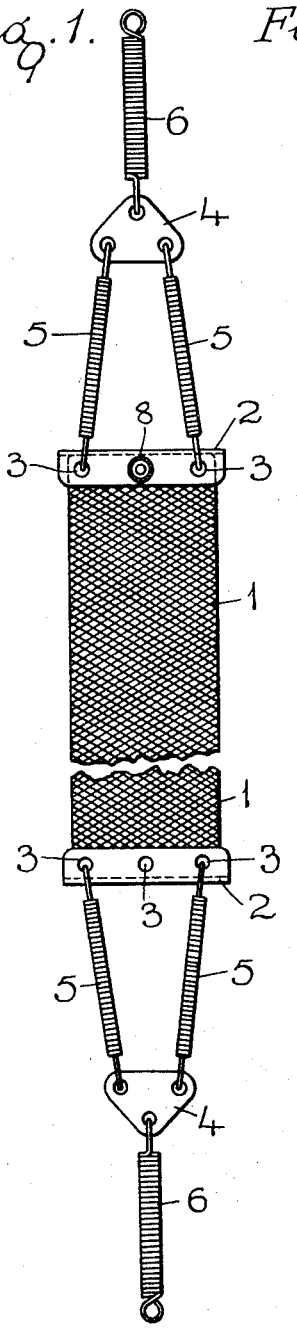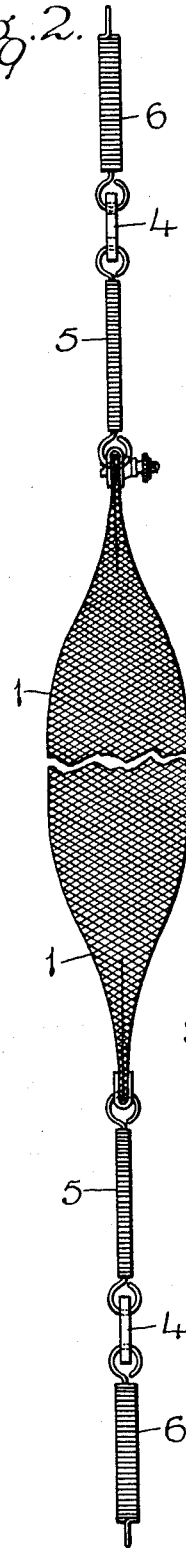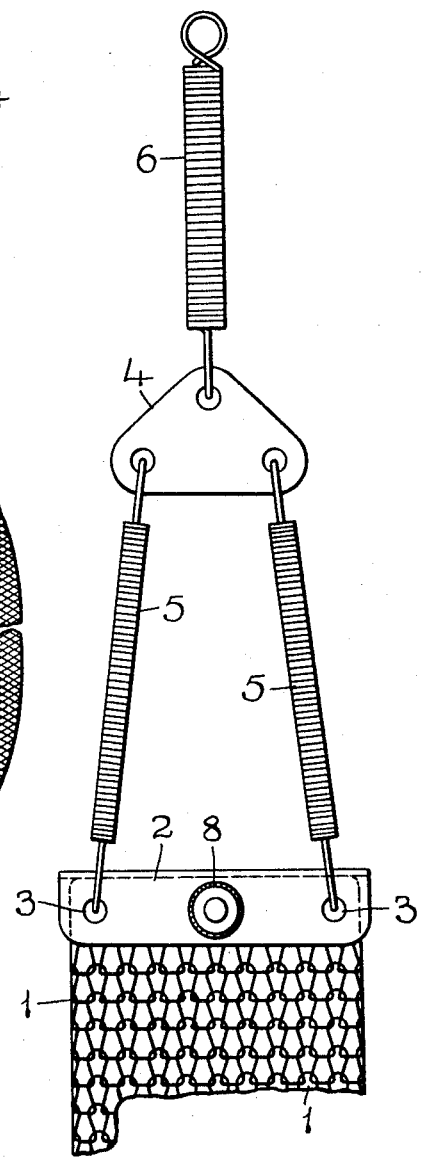

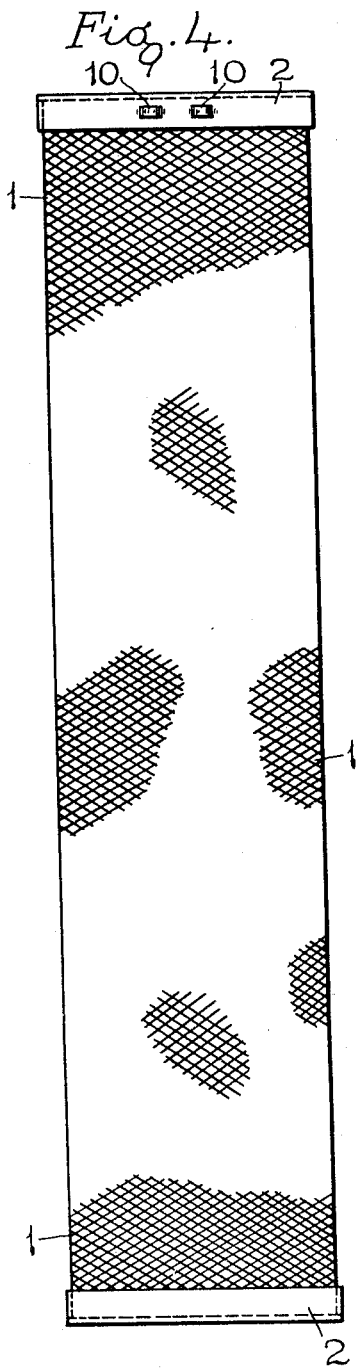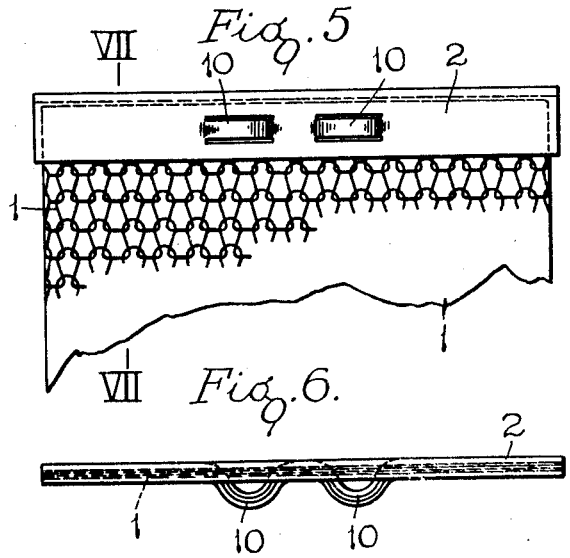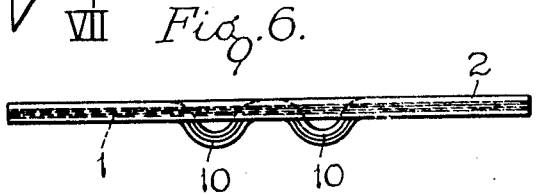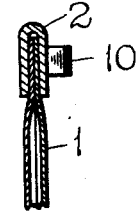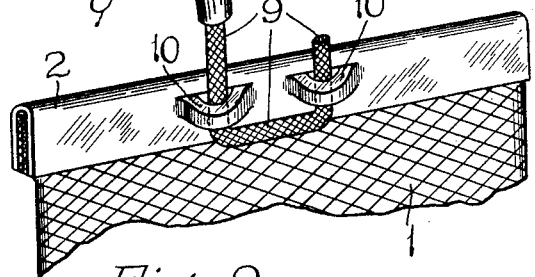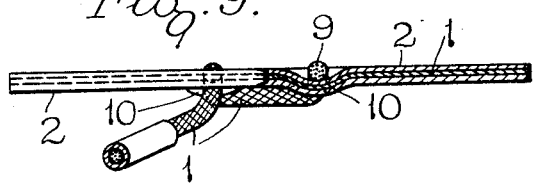

1,962,041

UNITED STATES PATENT OFFICE 1,962,041

CONSTRUCTION OF AERIAL OR EARTH DEVICE FOR WIRELESS APPARATUS

James William Spong, London, England

Application February 18, 1932, Serial No. 593,818
In Great Britain March 3, 1931

3 Claims. (Cl. 250—33)

It is well known that high frequency impulses radiated from wireless transmitters are collected by metal aerials and that the high frequency impulses are most dense on the surface of the aerial, therefore, to give the greatest efficiency it is desirable that the collective or surface area of the aerial should be as large as possible for any given length, also with earths it is desirable to have as large a surface area as possible, and the object of this invention is to provide an aerial particularly an indoor aerial or an earth with the maximum of surface area.

According to this invention I construct the aerial or earth of wire or strip knitted into a metallic fabric either of flat or tubular cross-section, and such wire may be of flat or round cross-section.

My invention will be clearly understood from the following description aided by the accompanying drawings in which:—

Figure 1 is a plan view (broken in the center) of one example of an aerial constructed according to this invention.

Figure 2 is a side view of same and

Figure 3 is a view on an enlarged scale of one end of the aerial.

Figure 4 is a plan view of an earth mat constructed according to this invention.

Figure 5 is a view on an enlarged scale of one end of the earth mat.

Figure 6 is an end view of same.

Figure 7 is a section on the lines VII, VII of Figure 2.

Figure 8 is a perspective view of one end showing means for connecting the earth wire.

Figure 9 is an end view, partly in section, showing the earth wire connected.

In my preferred construction for an aerial, and as shown in Figures 1, 2 and 3 of the drawings, I employ a comparatively small gauge flat copper or phosphor-bronze wire or strip, and knit same into a closed surface, mathematically expressed, and specifically a tubular length 1 of comparatively large mesh, and for a complete indoor aerial secure each end of a length 1 to connections by which the aerial can be supported in the usual manner.

Such connections may be of any suitable construction and a convenient construction is illustrated in Figures 1, 2 and 3 of the drawings in which the ends of the length 1 are gripped between metal bars or clamps 2, 2 having holes 3, 3, 3 and each clamp is connected to a member 4 of insulating material by helical springs 5 engaged in the outside holes in the clamps 2 and holes in the insulating members 4.

Helical springs 6 are connected at one end to the insulating members 4 and the other ends are adapted to be connected to a hook or nail or other support.

A terminal 8 is secured to one of the clamps 2, or one in each clamp, for connection of the "lead in" wire.

The springs 5, 5 and 6 enable the aerial to be hung under slight tension so as to keep same taut. Although the clamps 2 enable the tubular length 1 to be flattened for ease in packing and transit, it is found in practice that when the aerial is hung, if the fingers are passed down the folds when in the flat condition to shape the length 1 so as to be approximately circular in cross-section between the ends, it will retain that shape.

Various other constructions of connections may be employed and the wire or strip metal may be bare or coated with an insulating material.

By constructing the aerial of knitted wire or strip a maximum collective surface area is obtained which also reduces aerial to earth damping to a minimum and in consequence retains sensitivity with better selective properties.

For use as an earth the main portion is constructed from wire or strip knitted into a metallic fabric 1 either of flat or tubular cross-section, and such wire may be of flat or round cross-section. The wire or strip for the earth is of pure copper or other non-corrosive metal and a length of the knitted material 1 is provided at each end with a clamp, plate or clip also of copper or other non-corrosive metal to one of which the earth wire may be connected by enclosing same in the clamp or clip or attaching to the plate by welding or in any other manner which insures a good electrical and non-corrosive connection.

A convenient method is to employ a strip of copper 2, for each end, bent over on itself along its length and with the end of the knitted metal fabric 1 clamped or gripped between same, and for securing the earth wire 9 one or more pairs of parallel slits are made through the folds of the strip 2 and fabric, and the portion between each pair of slits pressed out to form an eye 10 or loop through which the earth wire 9 can be threaded, as will be understood from Figure 8, and by hammering or pressing down the eyes 10 or loops the wire is firmly held to the plate 2 as in Figure 9.

Preferably the knitted fabric 1 as an earth is wider and shorter than when made for an aerial.

For use as a counterpoise earth the device or mat can be positioned under the carpet or floor on which the wireless apparatus stands, or as a definite earth may be buried in the ground.

By reason of its knitted or woven construction a very large surface area is provided and when buried the knitted or woven construction permits moisture to penetrate and thus create a conductivity to earth over its entire surface.

What I do claim as my invention and desire to secure by Letters Patent is:—

1. An antenna device for wireless apparatus consisting of a single length conductor knitted into a flexible fabric having a closed surface.

2. An antenna device for wireless apparatus consisting of a single length conductor knitted into a flexible fabric having a closed surface, the construction enabling the device to be flattened and also to be bulged into and of itself remain in tubular form, and a bar at each end of the device to facilitate flat folding of the device when not in use and to enable the mounting of the device.

3. An antenna device for wireless apparatus according to claim 2 having a binding post on one of the bars, insulating elements for attachment to supports, and connections from the bars to the insulating elements.

JAMES WILLIAM SPONG.